(12) United States Patent
Weinländer et al.

(10) Patent No.: US 7,707,519 B2
(45) Date of Patent: Apr. 27, 2010

(54) SEARCHABLE REGISTERS

(75) Inventors: Markus Weinländer, Happurg (DE); Helmut Windl, Peisig (DE)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 11/170,664

(22) Filed: Jun. 29, 2005

(65) Prior Publication Data

US 2006/0001672 A1    Jan. 5, 2006

(30) Foreign Application Priority Data

Jun. 30, 2004    (EP) .................................. 04015409

(51) Int. Cl.
*G06F 3/048*    (2006.01)
(52) U.S. Cl. ...................... 715/854; 715/810; 715/777
(58) Field of Classification Search ................. 715/781, 715/828, 810, 853, 856, 854
See application file for complete search history.

(56) References Cited

U.S. PATENT DOCUMENTS

| | | | |
|---|---|---|---|
| 5,923,328 A * | 7/1999 | Griesmer ..................... 715/854 |
| 6,404,443 B1 | 6/2002 | Westerman | |
| 6,642,946 B1 * | 11/2003 | Janes et al. .................. 715/854 |
| 2002/0003548 A1 * | 1/2002 | Krusche et al. ............. 345/736 |
| 2002/0113822 A1 | 8/2002 | Windl et al. | |
| 2002/0163545 A1 * | 11/2002 | Hii .............................. 345/838 |
| 2004/0001106 A1 * | 1/2004 | Deutscher et al. ........... 345/838 |
| 2004/0139391 A1 * | 7/2004 | Stumbo et al. .............. 715/512 |
| 2005/0076312 A1 * | 4/2005 | Gardner et al. ............. 715/853 |
| 2005/0152552 A1 * | 7/2005 | Multerer et al. ............ 380/259 |
| 2005/0182831 A1 * | 8/2005 | Uchida et al. ............... 709/220 |

* cited by examiner

*Primary Examiner*—Ting Lee

(57) ABSTRACT

The invention relates to a device for displaying information, data and/or input elements on an interface (4), in particular on a screen, with at least one register (1) for displaying a subset of information, data and/or input elements, with the at least one register having a selectable, sensitive area on the interface and with means for showing the content (2) of the at least one register (1) on selection of the sensitive area (11) of the register (1).

2 Claims, 4 Drawing Sheets

SEARCHABLE REGISTERS

CROSS REFERENCE TO RELATED APPLICATIONS

This application claims priority to the European application No. 04015409.8, filed Jun. 30, 2004 and which is incorporated by reference herein in its entirety.

FIELD OF INVENTION

The invention relates to a device for displaying information, data and/or input elements on an interface as well as a corresponding method.

SUMMARY OF THE INVENTION

The capacity of modern software applications has increased significantly in the last two decades. A large number of functions are now available to the user. At the same time the volume of data used within a software application has increased or is more highly structured. This makes user interfaces increasingly more complex. On the other hand the screen resolution typically available has only doubled since 1990. It is therefore a matter of accommodating a greater function and data density on the small amount of space offered by a screen.

One way of structuring different data or offering it to the user is to use so-called registers. A plurality of windows is thereby displayed on a screen interface to appear as if one on top of the other in such a fashion that only one tab panel or heading of the corresponding register can be seen. The user moves the mouse pointer onto such a register and clicks on it to bring the selected register to the foreground. The user can then access the content of said register. However the selected register covers the previous register, so if the user wants the latter register, said original register has to be brought to the foreground by a further mouse click.

The register method described is used in almost all areas of a user interface. For example for input dialogs, to switch between different work areas or to organize navigation areas.

However switching by means of a mouse click has disadvantages:

Usability tests have shown that when users search for specific information without knowing its exact position on the screen, they search for the required element by browsing. They do not click on it, as clicking could initiate an action that the user does not want. The user only wants to search the interface for information. However clicking constantly switches the displayed screen content. If the user wishes to look at a different register just for a short time—i.e. for a single action or to record an individual item of information, said user must then actively switch back to the previous register, i.e. by a mouse click. During the switch between registers the overview of information associated with the registers can easily be lost by the user.

The object of the present invention is therefore to specify a device and a method, which make it possible to alternate between different registers to display information in a simple fashion.

The object is achieved by a device for displaying information, data and/or input elements on an interface, in particular on a screen, with at least one register to display a subset of information, data and/or input elements, the at least one register having a selectable, sensitive area on the interface and with means for showing the content of the at least one register on selection of the sensitive area of the register.

The object is also achieved by a method for displaying information, data and/or input elements on an interface, in particular on a screen, with which a subset of information, data and/or input elements is displayed in a register and the content of the at least one register is shown on selection of a sensitive area of the register.

The invention is based on the knowledge that information, which is so complex due to the volume of data and the data structure that it has to be distributed over a plurality of registers, can be displayed in a simple fashion to a user, if on selection by the user the registers are superimposed in respect of their content, i.e. if hover registers are used. The user thereby only has to select the sensitive area of a register and the content of the corresponding register is superimposed. The register remains superimposed as long as the user remains in the sensitive area on the interface with the aid of selector elements. If the user leaves the corresponding sensitive area with the selector means, the original register, which was displayed before the superimposition of the second register, is displayed again.

This allows the user to display information for themselves without deactivating the original register, in which the user can be active and carry out input operations or select elements. The user therefore always has an overview of the register in which they are active at the time.

The user is therefore able to search for information without changing the active register.

A further advantageous embodiment of the invention is characterized in that a selector element is provided to select the at least one register to be displayed, said selector element being such that it can be moved over the interface by a user of the device. The selector element can be a cursor for example, which is moved with the assistance of a mouse over the screen, and when it passes over the sensitive area, for example a register tab, the corresponding register is superimposed. The selector element can also be a cursor, which is activated by a user's finger on the screen, in that an action is initiated by the user's finger at a corresponding sensitive point on the register, for example on a touch screen. It is important that when the corresponding sensitive area is passed over or pressed, the required register is superimposed but not activated immediately. If the selector element than leaves the sensitive area of the corresponding register again, the original register is correspondingly displayed. The selected register is therefore superimposed but not activated.

A further advantageous embodiment of the invention is characterized in that the means for showing are configured such that the content of the shown register remains shown, as long as the selector element remains located within the interface of the shown register. It is advantageous here for the user to be able to move the selector element, for example the selector means, to and fro on the area which is shown over the selected register and therefore to be able to point to specific information. As long as the user navigates with the selector element within the area of the superimposed register, the corresponding register remains superimposed. If the user leaves the display area of the corresponding register with the selector element, i.e. the mouse pointer or their finger for example, the register is once again masked out.

When the register is masked out, either the original register together with its content can be displayed full-size again or just a register bar, i.e. the individual tabs of the registers to be selected or which can be selected, can be displayed, if a larger work area is preferably to be made available.

A further advantageous embodiment is characterized in that means for activating at least one register are provided. It is advantageous here, if for example only one tab bar of the corresponding available registers is displayed at the edge of the screen, for it to be possible to activate one of the registers by means of the selector element, in that the user clicks on the sensitive area of the corresponding register. In contrast to passing over the sensitive area, the corresponding register can become active and the user can activate input.

A further advantageous embodiment of the invention is characterized in that the means for activating the at least one register are configured such that an activated register becomes active, when a selected further register is shown.

It is particularly advantageous here for a user not to have to leave the register they have activated, when looking for information in further registers. The once activated register, in which the user sometimes wishes to work and in which said user wishes to activate input, remains active, even when other registers are shown in the meantime in order to search for information. If a register change is required in respect of the activity, instead of simply moving to the sensitive area of another register with the selector element and thus showing the information, the user must instead click actively on the sensitive area, so that the register thus selected becomes active.

The invention is described and explained in more detail below with reference to the exemplary embodiments shown in the figures.

DETAILED DESCRIPTION OF THE INVENTION

Figure 1:
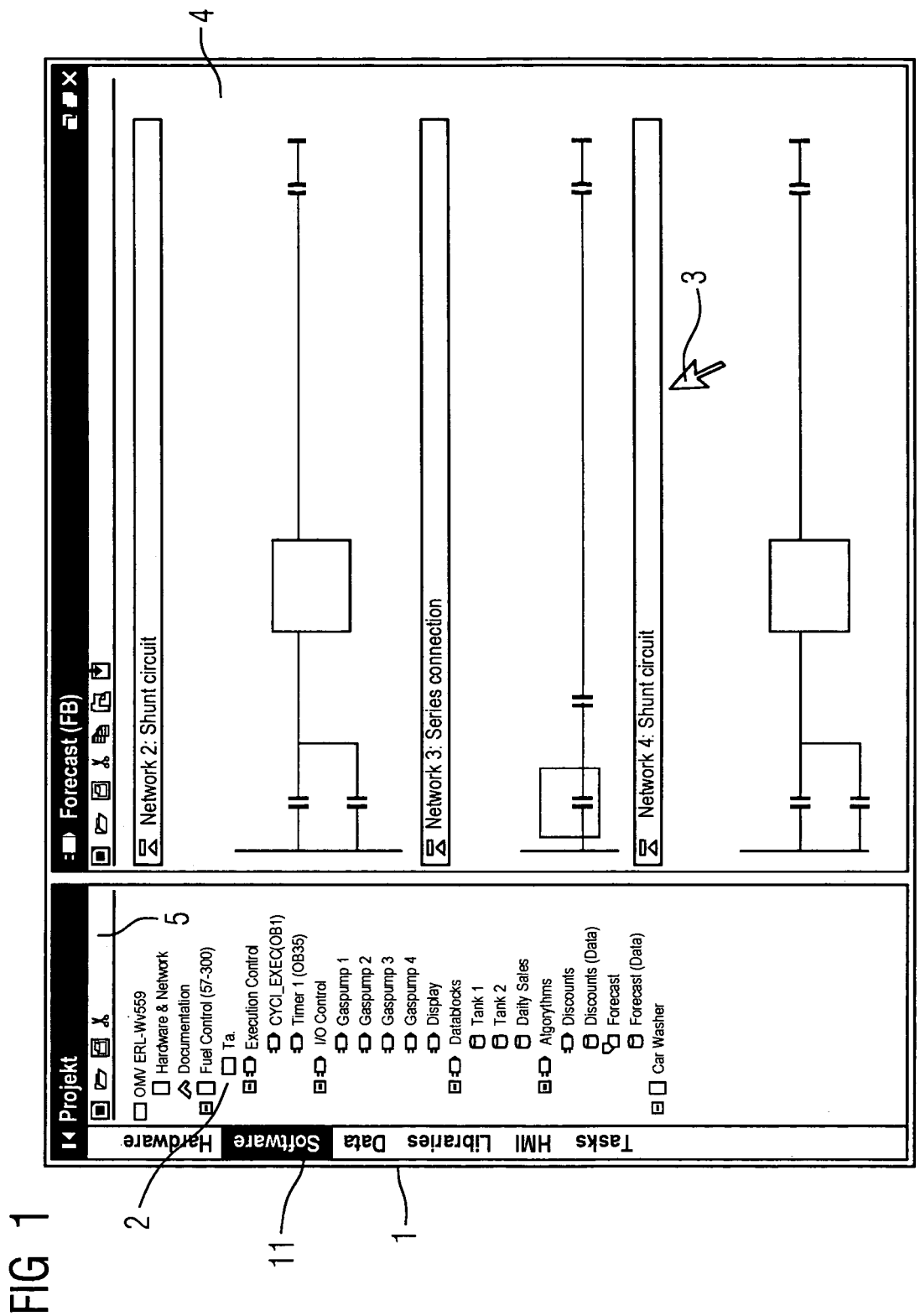
FIG. 1 shows an interface with selectable registers.

FIG. 1 shows an embodiment of the invention using the example of a fictional engineering application. The application comprises a work area or interface 4 and a navigation area or an area in which information, data or input elements are displayed in the form of the content of a register. Because of the volume and structure of its data, the navigation area is so complex that it is provided in a plurality of registers 1. In the example shown the registers offered are "Hardware", "Software", "Data", "Libraries", "HMI" and "Tasks". In the example the "Software" register is active. The registers 1 have tabs, which are configured as so-called sensitive areas 11. In the shown registers (so-called hover registers) the content 2 of the respective register is displayed on an interface 5 assigned to the register. In the static state, when for example the selector element 3 in the form of the mouse or the finger of a user is outside the register, the shown "Software" register is no different from a regular register. The "Software" register is active and the content 2 of the register 1 is displayed to the user.

The difference between it and a regular register results from the interaction of the user with the registers 1. As soon as the selector element 3 or the mouse pointer or finger of a user is moved over a register 1 or the sensitive area 11 of a register, the device immediately—i.e. without a mouse click—displays the content 2 of the corresponding register.

Figure 2:
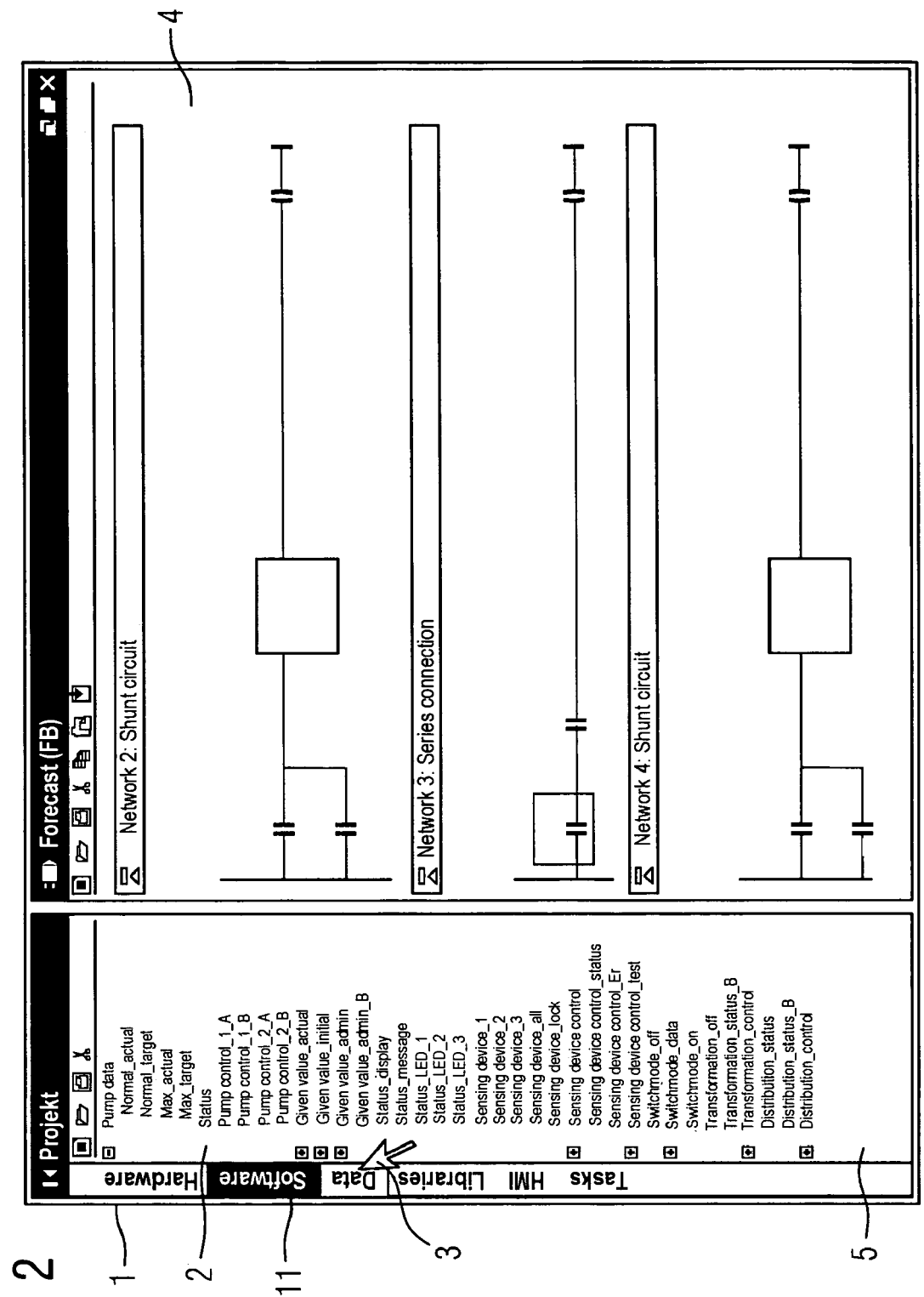
FIG. 2 shows an interface with a shown register and an active register.

In FIG. 2 for example the selector element configured as a mouse pointer was moved to the sensitive area 11 of the register 2 with the name "Data". This causes the corresponding register 1 to be superimposed and the content 2 of the register to be displayed. The active register is however still the register with the name "Software". Only the content of the "Data" register is therefore displayed to the user. Should said user wish to work in the register, they must activate it using the selector element 3.

As long as the selector element 3 or mouse pointer or finger of the user remains on the interface 5 or the navigation area of the shown register, the content of the register is displayed and the user can read the information and even process elements. If the user moves the mouse pointer to a further register (e.g. Libraries), this would move to the foreground instead of the "Data" register and the information would be displayed accordingly in the navigation area or on the interface 5 associated with the register. If however the user moves the mouse pointer or their finger to a quite different area of the screen, for example the work area 4 of the interface, the previously active "Software" register is displayed again. For the user to bring the shown register (hover register) permanently to the foreground, a mouse click is required on the corresponding register or an action with the finger.

The user can thereby browse the content of the registers by moving the selector element or the mouse pointer or finger over the register tabs, thereby moving from one register to the next. The user can work in a shown register or so-called hover register once without initiating a permanent register switch. As soon as the user leaves the hover register, the original active window moves back to the foreground.

Figure 3:
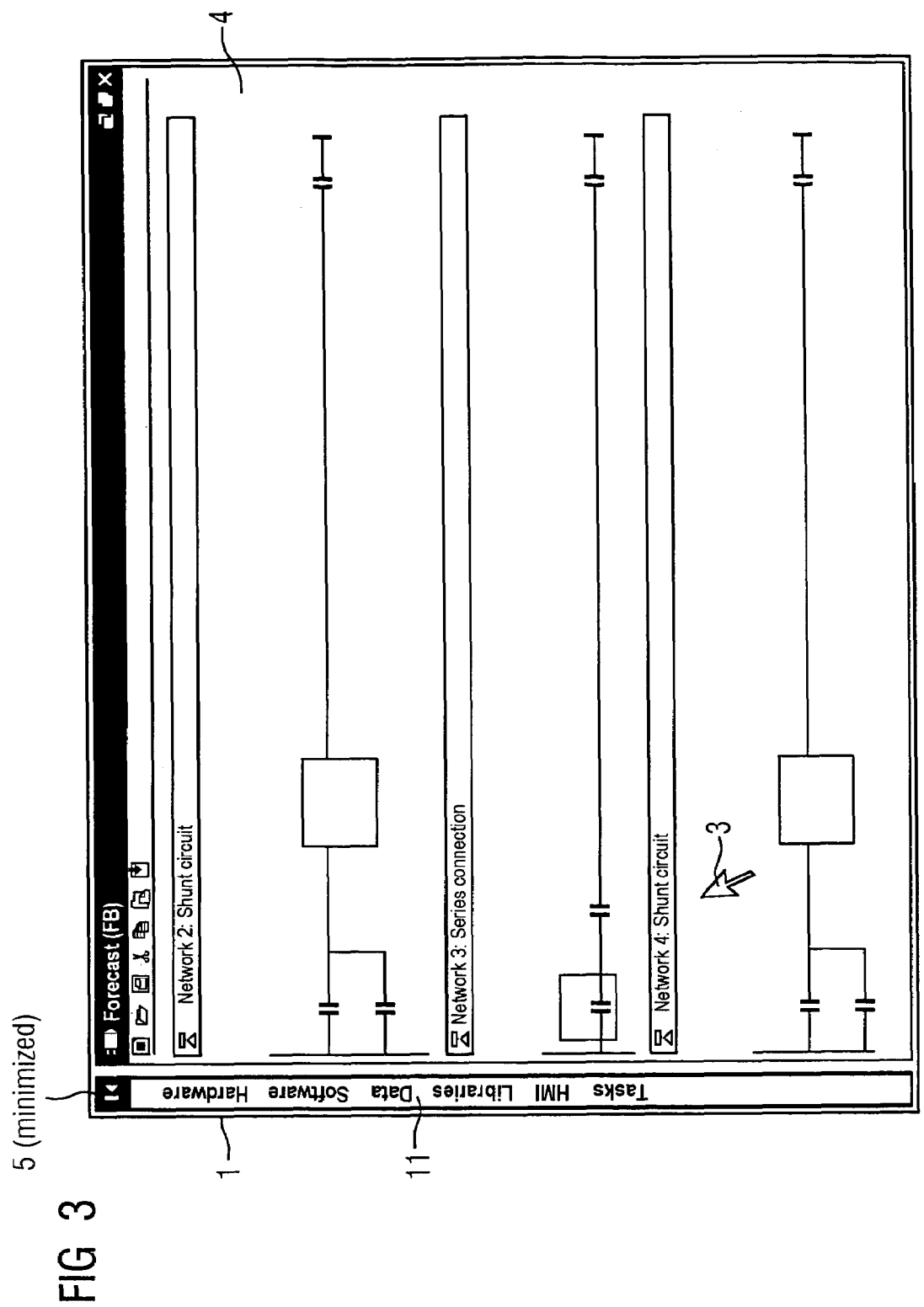
FIG. 3 shows an interface with a register bar.

A variant of the device according to the invention is shown in FIG. 3. Here the invention is used to maximize the screen area available for the working surface. The navigation area or interface 5, which displays the content of the register, is hereby minimized so that only the tabs 11 of the register 1 remain visible. The user therefore has the entire width of the screen available as their work area.

Figure 4:
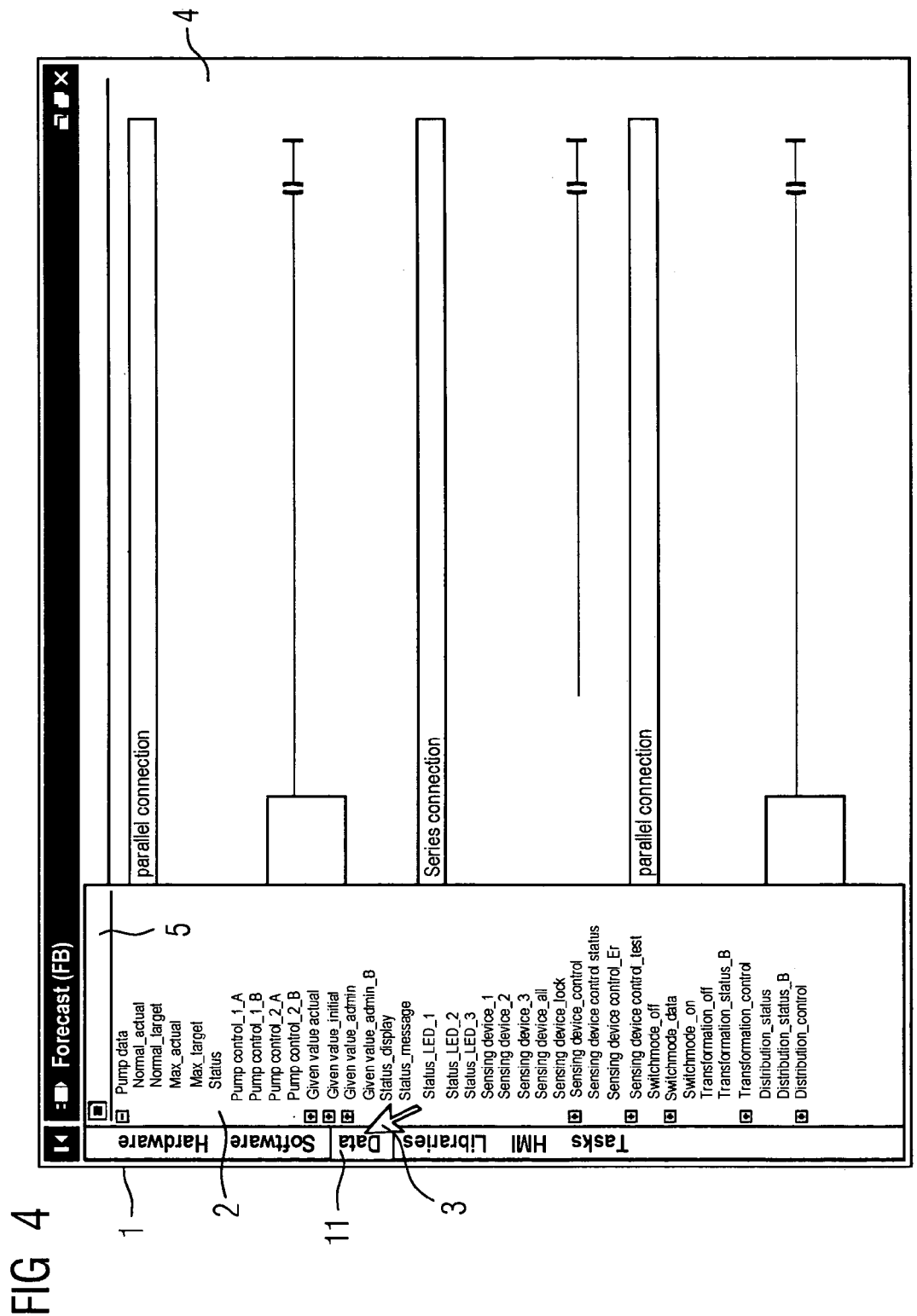
FIG. 4 shows an interface with a shown register.

According to the method described the user can also access the content 2 of the register 1 quickly in the navigation area 5. As soon as the selector element 3 or the mouse pointer is moved over a register tab, the sensitive area 11 of a register 1, the content 2 of the corresponding register is displayed in the foreground. However the work area is thereby partially covered (FIG. 4). If the user then moves the selector element 3 or the mouse pointer or finger to another register 1, this appears in the foreground. If however the user moves the selector element 3 or the mouse pointer or finger back to the working surface 4, the shown hover register disappears again. Finally the user can also click on the hover register. The navigation area 5, in which the content 2 of the register 1 is displayed, then reappears permanently on the screen.

The described invention can also be used in any other software applications, for example Word, other text processing systems, table calculation systems, graphics applications and presentation applications as well as the example of an engineering system shown.

The invention claimed is:

1. A computer-readable storage medium encoded with a computer program executable by a computer, the program comprising computer-readable code which when executed by the computer causes the computer to display information, data and/or input elements on a user interface by:
   displaying a plurality of registers, each register having a respective tab positioned along an edge of a work area of the user interface;
   activating a first register to function as an active register for receiving inputs, wherein the activating of the first register comprises a user performing a mouse click on the respective tab of the first register, wherein the activating of the first register causes displaying a content of said first register, wherein the content comprises a subset of the information, data and/or input elements related to the first register; and selecting at least a second register while the first register continues to be the active register, wherein the selecting of said at least second register comprises hovering a selector element over a respective tab of said at least second register without causing said at least second register to be an active register, and without performing a mouse click, wherein the selecting of said at least second register causes displaying a content of said at least second register, wherein the displaying of the content of said at least second register comprises displaying a second subset of the information, data and/or input elements on a foreground of the display to hide the display of the subset associated with the first register as long as the selector element continues hovering over the respective tab of said at least second register, the first register continues to be the active register while the subset associated with the first register is covered and hidden from view by the content of the second register, wherein an activating of said at least second register to become an active register for receiving inputs and a deactivating of the first register as the active register comprises a user performing a mouse click on the respective tab of said at least second register.

2. A method for displaying information, data, and/or input elements on an user interface, comprising:

providing a work area;

displaying a plurality of registers, each register having a respective tab positioned along an edge of the work area of the user interface;

activating a first register to function as an active register for receiving inputs, wherein the activating of the first register comprises a user performing a mouse click on the respective tab of the first register, wherein the activating of the first register causes displaying a content of said first register, wherein the content comprises a subset of the information, data and/or input elements related to the first register; and selecting at least a second register while the first register continues to be the active register, wherein the selecting of said at least second register comprises hovering a selector element over a respective tab of said at least second register without causing said at least second register to be an active register and without performing a mouse click, wherein the selecting of said at least second register causes displaying a content of said at least second register, wherein the displaying of the content of said at least second register comprises displaying a second subset of the information, data and/or input elements on a foreground of the display to hide the display of the subset associated with the first register as long as the selector element continues hovering over the respective tab of said at least second register, the first register continues to be the active register while the subset associated with the first register is covered and hidden from view by the content of the second register, wherein an activating of said at least second register to become an active register for receiving inputs and a deactivating of the first register as the active register comprises a user performing a mouse click on the respective tab of said at least second register.

* * * * *